US012738007B2

(12) United States Patent
Shiraishi

(10) Patent No.: US 12,738,007 B2
(45) Date of Patent: Sep. 15, 2026

(54) INFORMATION PROCESSING APPARATUS, INFORMATION PROCESSING METHOD, AND RECORDING MEDIUM

(71) Applicant: NEC Corporation, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 18/399,031

(22) Filed: Dec. 28, 2023

(65) Prior Publication Data

US 2024/0233307 A1 Jul. 11, 2024

(30) Foreign Application Priority Data

Jan. 11, 2023 (JP) ................................ 2023-002468

(51) Int. Cl.

| | |
|---|---|
| ***G06V 10/26*** | (2022.01) |
| ***G06N 3/091*** | (2023.01) |
| ***G06N 3/092*** | (2023.01) |
| ***G06V 10/25*** | (2022.01) |
| ***G06V 10/28*** | (2022.01) |
| ***G06V 10/764*** | (2022.01) |
| ***G06V 20/70*** | (2022.01) |

(52) U.S. Cl.

CPC ............ *G06V 10/25* (2022.01); *G06V 10/764* (2022.01); *G06V 20/70* (2022.01); *G06V 2201/07* (2022.01)

(58) Field of Classification Search

USPC ................ 382/100–294; 706/1–62, 900–905

See application file for complete search history.

(56) References Cited

U.S. PATENT DOCUMENTS 12,217,431 B2 * 2/2025 Hotson ................ G06V 10/776
2020/0394458 A1 * 12/2020 Yu ........................ G06V 10/454

(Continued)

FOREIGN PATENT DOCUMENTS

JP 2021-165944 A 10/2021
WO WO2020/183706 A1 11/2021

(Continued)

OTHER PUBLICATIONS

Zongxin Yang; DSC-PoseNet: Learning 6DeF Object Pose Estimation via Dual-scale Consistency; 2021 (Year: 2021).*

(Continued)

*Primary Examiner* — Marcellus J Augustin
(74) *Attorney, Agent, or Firm* — Sughrue Mion, PLLC

(57) ABSTRACT

An information processing apparatus includes: a score assigning section for assigning an objectness score to each of unit regions by inputting a training image to a region detection model for detecting, in an image, a region corresponding to an image of an object, a first pseudo label assigning section for assigning a pseudo label which indicates an object, to a partial region of the region having the ground-truth label attached thereto, in accordance with the score assigned to each of the unit regions, a second pseudo label assigning section for assigning a pseudo label which indicates a background, to a partial region of a region not having the ground-truth label attached thereto, in accordance with the score assigned to each of the unit regions, and the updating section for updating a model parameter of the region detection model, with reference to a region having attached thereto the pseudo label.

8 Claims, 12 Drawing Sheets

(56) References Cited

U.S. PATENT DOCUMENTS

| | | | | |
|---|---|---|---|---|
| 2021/0312233 | A1 | 10/2021 | Mishima et al. | |
| 2022/0101635 | A1* | 3/2022 | Koivisto | G01S 7/417 |
| 2022/0156585 | A1* | 5/2022 | Leng | G06F 18/2155 |
| 2022/0172457 | A1 | 6/2022 | Sato et al. | |
| 2023/0281858 | A1* | 9/2023 | Schulter | G06T 7/70 382/103 |
| 2023/0290132 | A1* | 9/2023 | Mahendran | G06V 20/20 |
| 2023/0334837 | A1 | 10/2023 | Takahashi et al. | |
| 2023/0360364 | A1* | 11/2023 | Wu | G06V 10/764 |

FOREIGN PATENT DOCUMENTS

| | | | |
|---|---|---|---|
| WO | 2022/064610 | A1 | 3/2022 |
| WO | 2022/185403 | A1 | 9/2022 |

OTHER PUBLICATIONS

Zongxin Yang et al., “DSC-PoseNet: Learning 6DoF Object Pose Estimation via Dual-scale Consistency”, Apr. 2021.

* cited by examiner

INFORMATION PROCESSING APPARATUS, INFORMATION PROCESSING METHOD, AND RECORDING MEDIUM

CROSS REFERENCE TO RELATED APPLICATIONS

This application is based upon and claims the benefit of priority from Japanese Patent Application No. 2023-0024 68 filed on Jan. 11, 2023, the disclosure of which is incorporated herein in its entirety by reference.

TECHNICAL FIELD

The present invention relates to a technique for detecting an object in an image.

BACKGROUND ART

Techniques for detecting an object region in an image have been proposed. For example, Non-Patent Literature 1 discloses generating a detection model through weakly supervised learning conducted with use of images in each of which a rectangular region containing the image of an article has a ground-truth label attached thereto.

CITATION LIST

Non-Patent Literature

[Non-patent Literature 1] Zongxin Yang et al., DSC-PoseNet: Learning 6DoF Object Pose Estimation via Dual-scale Consistency, April 2021

SUMMARY OF INVENTION

Technical Problem

An image used for training a detection model contains the image of an object not only in a region having a ground-truth label attached thereto but also in a region not having the ground-truth label attached thereto, in some cases, and contains a background in a region having a ground-truth label attached thereto, in other cases. In a case of using such images to train a detection model, there is a problem with the technique disclosed in Non-Patent Literature 1, the problem being a decrease in the detection accuracy of the detection model due to mis-learning such as learning, as a background image, the image of an object contained in a region not having a ground-truth label attached thereto or learning, as an object, a background image contained in a region having a ground-truth label attached thereto.

An example aspect of the present invention has been made in view of the above problem, and example object thereof is to provide a technique which makes it possible to generate a region detection model capable of accurately detecting an object region in an image.

Solution to Problem

An information processing apparatus in accordance with an example aspect of the present invention includes at least one processor, and the at least one processor carries out: an acquiring process of acquiring a training image in which a region containing an image of an object has a ground-truth label attached thereto; a score assigning process of assigning, to each of unit regions, a score which indicates objectness, by inputting the training image to a region detection model for detecting, in an image, a region corresponding to an image of an object; a first pseudo label assigning process of assigning a pseudo label which indicates an object, to a partial region of the region having the ground-truth label attached thereto, in accordance with the score assigned to each of the unit regions; a second pseudo label assigning process of assigning a pseudo label which indicates a background, to a partial region of a region not having the ground-truth label attached thereto, in accordance with the score assigned to each of the unit regions; and an updating process of updating a model parameter of the region detection model, with reference to a region having attached thereto the pseudo label which indicates an object or the pseudo label which indicates a background.

An information processing method in accordance with an example aspect of the present invention includes: at least one processor acquiring a training image in which a region containing an image of an object has a ground-truth label attached thereto; the at least one processor assigning, to each of unit regions, a score which indicates objectness, by inputting the training image to a region detection model for detecting, in an image, a region corresponding to an image of an object; the at least one processor assigning a pseudo label which indicates an object, to a partial region of the region having the ground-truth label attached thereto, in accordance with the score assigned to each of the unit regions; the at least one processor assigning a pseudo label which indicates a background, to a partial region of a region not having the ground-truth label attached thereto, in accordance with the score assigned to each of the unit regions; and the at least one processor updating a model parameter of the region detection model, with reference to a region having attached thereto the pseudo label which indicates an object or the pseudo label which indicates a background.

A recording medium in accordance with an example aspect of the present invention is a computer-readable, non-transitory recording medium having recorded thereon a program for causing a computer to function as an information processing apparatus, the program causing the computer to carry out: a process of acquiring a training image in which a region containing an image of an object has a ground-truth label attached thereto; a process of assigning, to each of unit regions, a score which indicates objectness, by inputting the training image to a region detection model for detecting, in an image, a region corresponding to an image of an object; a process of assigning a pseudo label which indicates an object, to a partial region of the region having the ground-truth label attached thereto, in accordance with the score assigned to each of the unit regions; a process of assigning a pseudo label which indicates a background, to a partial region of a region not having the ground-truth label attached thereto, in accordance with the score assigned to each of the unit regions; and a process of updating a model parameter of the region detection model, with reference to a region having attached thereto the pseudo label which indicates an object or the pseudo label which indicates a background.

Advantageous Effects of Invention

According to an example aspect of the present invention, it is possible to generate a region detection model capable of accurately detecting an object region in an image.

BRIEF DESCRIPTION OF DRAWINGS

FIG. 4 is a block diagram illustrating a configuration of an information processing apparatus in accordance with the second example embodiment.

FIG. 9 is a block diagram illustrating a configuration of an information processing apparatus in accordance with a third example embodiment.

FIG. 12 is a diagram illustrating a specific example of a region to which a pseudo label is assigned in the third example embodiment.

FIG. 13 is a block diagram illustrating a configuration of an information processing apparatus in accordance with a fourth example embodiment.

FIG. 14 is a block diagram illustrating a configuration of a computer which functions as the information processing apparatuses in accordance with the example embodiments.

EXAMPLE EMBODIMENTS

First Example Embodiment

The following description will discuss a first example embodiment of the present invention in detail, with reference to the drawings. The present example embodiment is basic to example embodiments which will be described later.

(Configuration of Information Processing Apparatus)

Figure 1:
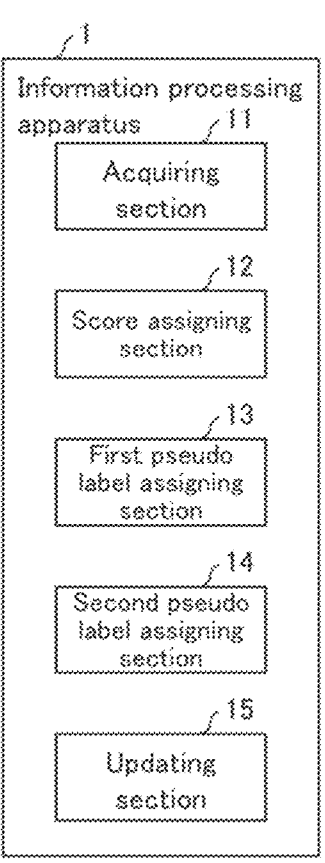
FIG. 1 is a block diagram illustrating a configuration of an information processing apparatus in accordance with a first example embodiment.

A configuration of an information processing apparatus 1 in accordance with the present example embodiment will be described below with reference to FIG. 1. FIG. 1 is a block diagram illustrating a configuration of the information processing apparatus 1. The information processing apparatus 1 includes an acquiring section 11 (acquiring means), a score assigning section 12 (score assigning means), a first pseudo label assigning section 13 (first pseudo label assigning means), a second pseudo label assigning section 14 (second pseudo label assigning means), and an updating section 15 (updating means).

The acquiring section 11 acquires a training image in which a region containing the image of an object has a ground-truth label attached thereto. The score assigning section 12 assigns, to each of unit regions, a score which indicates objectness, by inputting the training image to a region detection model for detecting, in an image, a region corresponding to an image of an object. The first pseudo label assigning section 13 assigns a pseudo label which indicates an object, to a partial region of the region having the ground-truth label attached thereto, in accordance with the score assigned to each of the unit regions. The second pseudo label assigning section 14 assigns a pseudo label which indicates a background, to a partial region of a region not having the ground-truth label attached thereto, in accordance with the score assigned to each of the unit regions. The updating section 15 updates a model parameter of the region detection model, with reference to a region having attached thereto the pseudo label which indicates an object or the pseudo label which indicates a background.

As above, a configuration employed in the information processing apparatus 1 in accordance with the present example embodiment is such that an acquiring section 11, a score assigning section 12, a first pseudo label assigning section 13, a second pseudo label assigning section 14, and an updating section 15 are included, the acquiring section 11 acquiring a training image in which a region containing an image of an object has a ground-truth label attached thereto, the score assigning section 12 assigning, to each of unit regions, a score which indicates objectness, by inputting the training image to a region detection model for detecting, in an image, a region corresponding to an image of an object, the first pseudo label assigning section 13 assigning a pseudo label which indicates an object, to a partial region of the region having the ground-truth label attached thereto, in accordance with the score assigned to each of the unit regions, the second pseudo label assigning section 14 assigning a pseudo label which indicates a background, to a partial region of a region not having the ground-truth label attached thereto, in accordance with the score assigned to each of the unit regions, the updating section 15 updating a model parameter of the region detection model, with reference to a region having attached thereto the pseudo label which indicates an object or the pseudo label which indicates a background. Therefore, the information processing apparatus 1 in accordance with the present example embodiment provides an example advantage of being capable of generating a region detection model capable of accurately detecting an object region in an image.

(Program)

The functions of the above information processing apparatus 1 can be implemented via a program. A program in accordance with the present example embodiment is a program for causing a computer to carry out: a process of acquiring a training image in which a region containing an image of an object has a ground-truth label attached thereto; a process of assigning, to each of unit regions, a score which indicates objectness, by inputting the training image to a region detection model for detecting, in an image, a region corresponding to an image of an object; a process of assigning a pseudo label which indicates an object, to a partial region of the region having the ground-truth label attached thereto, in accordance with the score assigned to each of the unit regions; a process of assigning a pseudo label which indicates a background, to a partial region of a region not having the ground-truth label attached thereto, in accordance with the score assigned to each of the unit regions; and a process of updating a model parameter of the region detection model, with reference to a region having attached thereto the pseudo label which indicates an object or the pseudo label which indicates a background.

(Flow of Information Processing Method)

Figure 2:
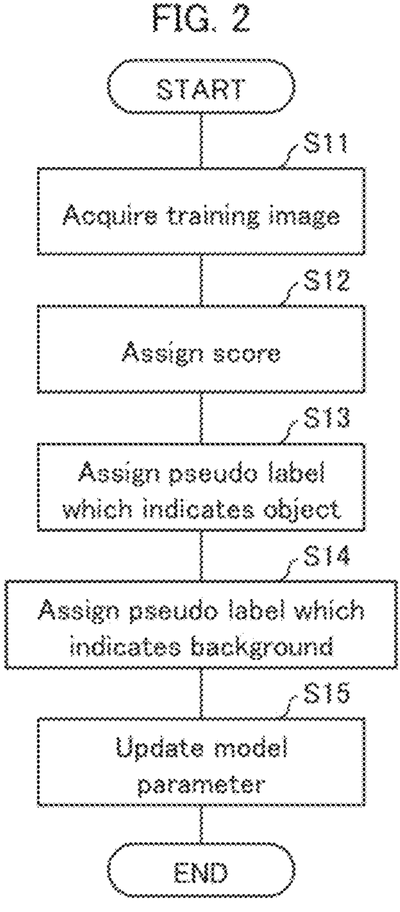
FIG. 2 is a flowchart illustrating a flow of an information processing method in accordance with the first example embodiment.

A flow of an information processing method S1 in accordance with the present example embodiment will be described below with reference to FIG. 2. FIG. 2 is a flowchart illustrating a flow of the information processing method S1.

It should be noted that a processor included in the information processing apparatus 1 may carry out the steps of the information processing method S1, or a processor included in another apparatus may carry out the steps of the information processing method S1.

In S11, at least one processor acquires a training image in which a region containing an image of an object has a ground-truth label attached thereto. In S12, the at least one processor assigns, to each of unit regions, a score which indicates objectness, by inputting the training image to a detection model for detecting, in an image, a region corresponding to an image of an object. In S13, the at least one processor assigns a pseudo label which indicates an object, to a partial region of the region having the ground-truth label attached thereto, in accordance with the score assigned to each of the unit regions. In S14, the at least one processor assigns a pseudo label which indicates a background, to a partial region of a region not having the ground-truth label attached thereto, in accordance with the score assigned to each of the unit regions. In S15, the at least one processor updates a model parameter of the region detection model with reference to a region having attached thereto the pseudo label which indicates an object or the pseudo label which indicates a background.

As above, a configuration employed in the information processing method S1 in accordance with the present example embodiment is such that the following are included: at least one processor acquiring a training image in which a region containing an image of an object has a ground-truth label attached thereto; the at least one processor assigning, to each of unit regions, a score which indicates objectness, by inputting the training image to a detection model for detecting, in an image, a region corresponding to an image of an object; the at least one processor assigning a pseudo label which indicates an object, to a partial region of the region having the ground-truth label attached thereto, in accordance with the score assigned to each of the unit regions; the at least one processor assigning a pseudo label which indicates a background, to a partial region of a region not having the ground-truth label attached thereto, in accordance with the score assigned to each of the unit regions, and the at least one processor updating a model parameter of the region detection model with reference to a region having attached thereto the pseudo label which indicates an object or the pseudo label which indicates a background. Therefore, the information processing method S1 in accordance with the present example embodiment provides an example advantage of being capable of generating a region detection model capable of accurately detecting an object region in an image.

(Configuration of Region Detection Model)

It can be said that the region detection model in accordance with the present example embodiment is a region detection model for detecting, in an image, a region corresponding to the image of an object, the region detection model being generated through machine learning in which the following (i) and (ii) are used: (i) a pseudo label which indicates an object and which is attached to a partial region in a training image in which a region containing the image of an object has a ground-truth label attached thereto, the partial region being included in the region having the ground-truth label attached thereto and having a score which indicates objectness and which satisfies a first condition; and (ii) a pseudo label which indicates a background and which is attached to a partial region in the training image, the partial region being included in a region not having the ground-truth label attached thereto and having the score which satisfies a second condition. With the region detection model in accordance with the present example embodiment, it is possible to accurately detect an object region in an image.

Second Example Embodiment (Outline of Information Processing Apparatus)

Figure 3:
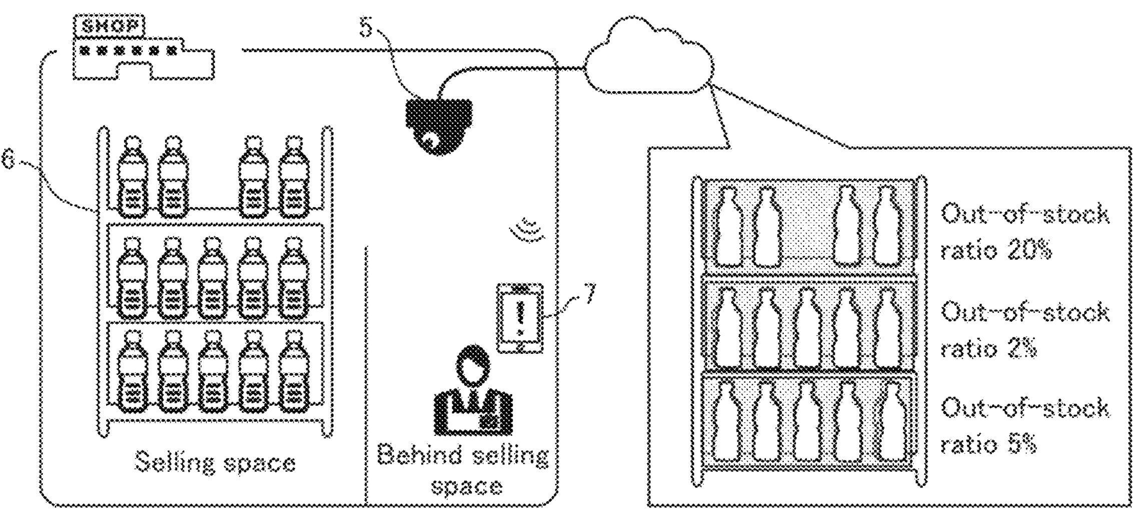
FIG. 3 is a diagram illustrating an example of a use case of a detection model in accordance with a second example embodiment.

An information processing apparatus 1A (see FIG. 4) in accordance with a second example embodiment of the present invention generates, through machine learning, a detection model LM1 (see FIG. 4) for detecting an object in an image. As an example, the detection model LM1 is used for services of detecting a stock-out on a store shelf in a retail store. FIG. 3 is a diagram illustrating an example of a use case of the detection model LM1. In the example of FIG. 3, an image capturing apparatus 5 captures an image of a store shelf 6 on which commercial products are displayed in a selling space of a retail store. The image captured by the image capturing apparatus 5 contains one or more commercial products, which are subjects. The information processing apparatus 1A inputs, to the detection model LM1, the image captured by the image capturing apparatus 5, to detect the commercial products contained as the subjects in the image, and calculate, in accordance with a result of the detection, information on commercial products such as an out-of-stock ratio. The information on commercial products is outputted so as, for example, to be displayed on a terminal 7 of an employee or the like of the retail store. The employee or the like uses the terminal 7 to understand, for example, the out-of-stock ratio of commercial products. However, the use of the detection model LM1 in accordance with the present example embodiment is not limited to the example illustrated in FIG. 3. The detection model LM1 may have uses including, for example, an analysis of the behavior of a person and automated driving.

(Configuration of Information Processing Apparatus)

Figure 4:
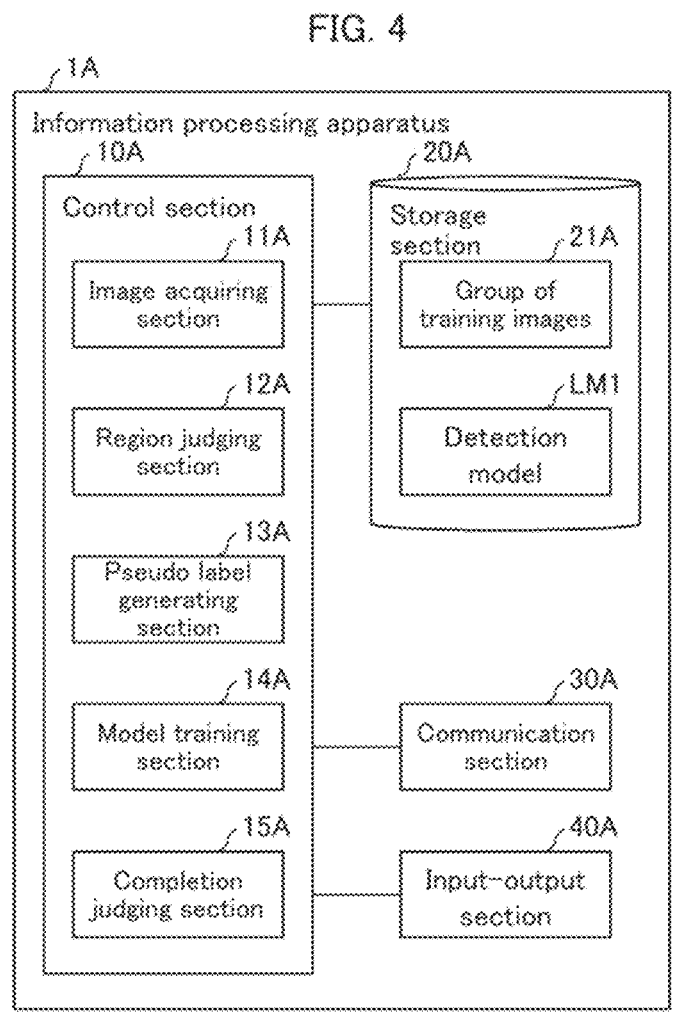

FIG. 4 is a block diagram illustrating a configuration of the information processing apparatus 1A in accordance with the second example embodiment. The information processing apparatus 1A includes a control section 10A, a storage section 20A, a communication section 30A, and an input-output section 40A.

The communication section 30A communicates with an apparatus external to the information processing apparatus 1A over a communication line. A specific configuration of the communication line does not limit the present example embodiment, but may be, as an example, a wireless local area network (LAN), a wired LAN, a wide area network (WAN), a public network, a mobile data communication network, or a combination thereof. The communication section 30A transmits, to another apparatus, data supplied from the control section 10A, and supplies the control section 10A with data received from another apparatus.

To the input-output section 40A, input-output equipment such as a keyboard, a mouse, a display, a printer, or a touch panel is connected. The input-output section 40A accepts, from the input equipment connected thereto, input of various kinds of information to the information processing apparatus 1A. In addition, the input-output section 40A outputs various kinds of information to the output equipment connected thereto, under the control of the control section 10A. Examples of the input-output section 40A include an interface such as a universal serial bus (USB).

The control section 10A performs overall control of the sections of the information processing apparatus 1A. The control section 10A includes an image acquiring section 11A, a region judging section 12A, a pseudo label generating section 13A, a model training section 14A, and a completion judging section 15A. The image acquiring section 11A is an example of the acquiring means in accordance with the present specification. The region judging section 12A is an example of the score assigning means in accordance with the present specification. The pseudo label generating section 13A is an example of the first pseudo label assigning means and the second pseudo label assigning means in accordance with the present specification. The model training section 14A is an example of the updating means in accordance with the present specification. The detection model LM1 is an example of the region detection model in accordance with the present specification.

The image acquiring section 11A acquires a group of training images in each of which a region containing the image of an object has a ground-truth label attached thereto. The group of training images is a set of training images to be used for training the detection model LM1. Each of the training images contains one or more regions each of which contains the image of an object, and the object is, for example, a commercial product to be displayed on a store shelf of a retail store. As an example, the training image may be a captured image of a store shelf having commercial products displayed thereon, or may be a composite image obtained by combining the images of commercial products with a background image which is a captured image of an empty store shelf. However, the training image is not limited to the above examples.

The region having the ground-truth label attached thereto (a region containing the image of an object) in the training image is, for example, a rectangular region. The rectangular region may be a rectangle which surrounds a single object, or may be a rectangle which surrounds a plurality of objects collectively. However, the region containing the image of an object is not limited to the rectangular region, but may be a region of another shape. In addition, the region having the ground-truth label attached thereto in the training image may be a partial region of the training image, or may be the entire region of the training image.

The image acquiring section 11A may acquire a group of training images to be inputted to the information processing apparatus 1A via the input-output section 40A, or may acquire the group of training images from a storage location (which may be inside the storage section 20A of the information processing apparatus 1A, or may be inside storage external to the information processing apparatus 1A) designated by a user of the information processing apparatus 1A. Further, the image acquiring section 11A may receive the group of training images from another apparatus via the communication section 30A of the information processing apparatus 1A.

The region judging section 12A assigns, to each of unit regions, a score which indicates objectness, by inputting the training images to the detection model LM1. The region corresponding to the image of an object is a region having the shape of the image of the object contained in an image. Furthermore, the score indicates that the greater the value of the score, the higher the possibility of being an object, and the smaller the value of the score, the higher the possibility of being a background. The unit regions are, for example, pixels.

The detection model LM1 detects, in an image, a region corresponding to the image of an object, and is generated through machine learning. The scheme for the machine learning of the detection model LM1 is not limited, but examples thereof may include, but not limited to, the scheme of semantic segmentation or instance segmentation (such as U-Net, fully convolutional networks (FCN), DeepLab v3+). In an inference phase, an input to the detection model LM1 includes image data which represents an image, and an output from the detection model LM1 includes information representing an object region. For ease of description, data representing an image is also referred to simply as an "image" in the following description. Further, the detection model LM1 assigns, to each of the unit regions of an inputted image, a score which indicates objectness.

In accordance with the score assigned to each unit region, the pseudo label generating section 13A assigns a pseudo label which indicates an object, to a partial region of the region having the ground-truth label attached thereto and further assigns a pseudo label which indicates a background, to a partial region of a region not having the ground-truth label attached thereto. In other words, the pseudo label generating section 13A assigns a pseudo label which indicates an object, to a partial region that is included in a region having a ground-truth label attached thereto and that has been assigned the score which satisfies a first condition, and further assigns a pseudo label which indicates a background, to a partial region that is included in a region not having the ground-truth label attached thereto and that has been assigned the score which satisfies a second condition.

The first condition indicates that the score is higher than that assigned to another region, and is, as an example, a condition of the score falling within the range of scores including the highest score, the range corresponding to a predetermined proportion (e.g., the top 90%), in the region having the ground-truth label attached thereto. In other words, the pseudo label generating section 13A assigns the pseudo label which indicates an object, to, as an example, a unit region having been assigned the score which falls within the range of scores including the highest score, the range corresponding to a predetermined proportion, in the region having the ground-truth label attached thereto.

The second condition indicates that the score is lower than that assigned to another region, and is, as an example, a condition of the score falling within the range of scores including the lowest score, the range corresponding to a predetermined proportion (e.g., the bottom 90%), in the region not having the ground-truth label attached thereto. In other words, the pseudo label generating section 13A assigns the pseudo label which indicates a background, to, as an example, a unit region having been assigned the score which falls within the range of scores including the lowest score, the range corresponding to a predetermined proportion, in the region not having the ground-truth label attached thereto. It should be noted that the first condition and the second condition are not limited to the above examples.

The model training section 14A updates a model parameter of the detection model LM1 with reference to a region having attached thereto the pseudo label which indicates an object or the pseudo label which indicates a background. Therefore, the model training section 14A does not use the entire training image for training of the detection model LM1, but uses a part (a region having a pseudo label attached thereto in the training image) of the training image for the training of the detection model LM1.

(Storage Section)

In the storage section 20A, various kinds of data used by the information processing apparatus 1A are stored. In particular, a group of training images 21A acquired by the image acquiring section 11A and the detection model LM1 are stored in the storage section 20A. In this respect, the detection model LM1 is stored in the storage section 20A means that model parameters defining the detection model LM1 are stored in the storage section 20A.

(Flow of Learning Phase Execution Method)

Figure 5:
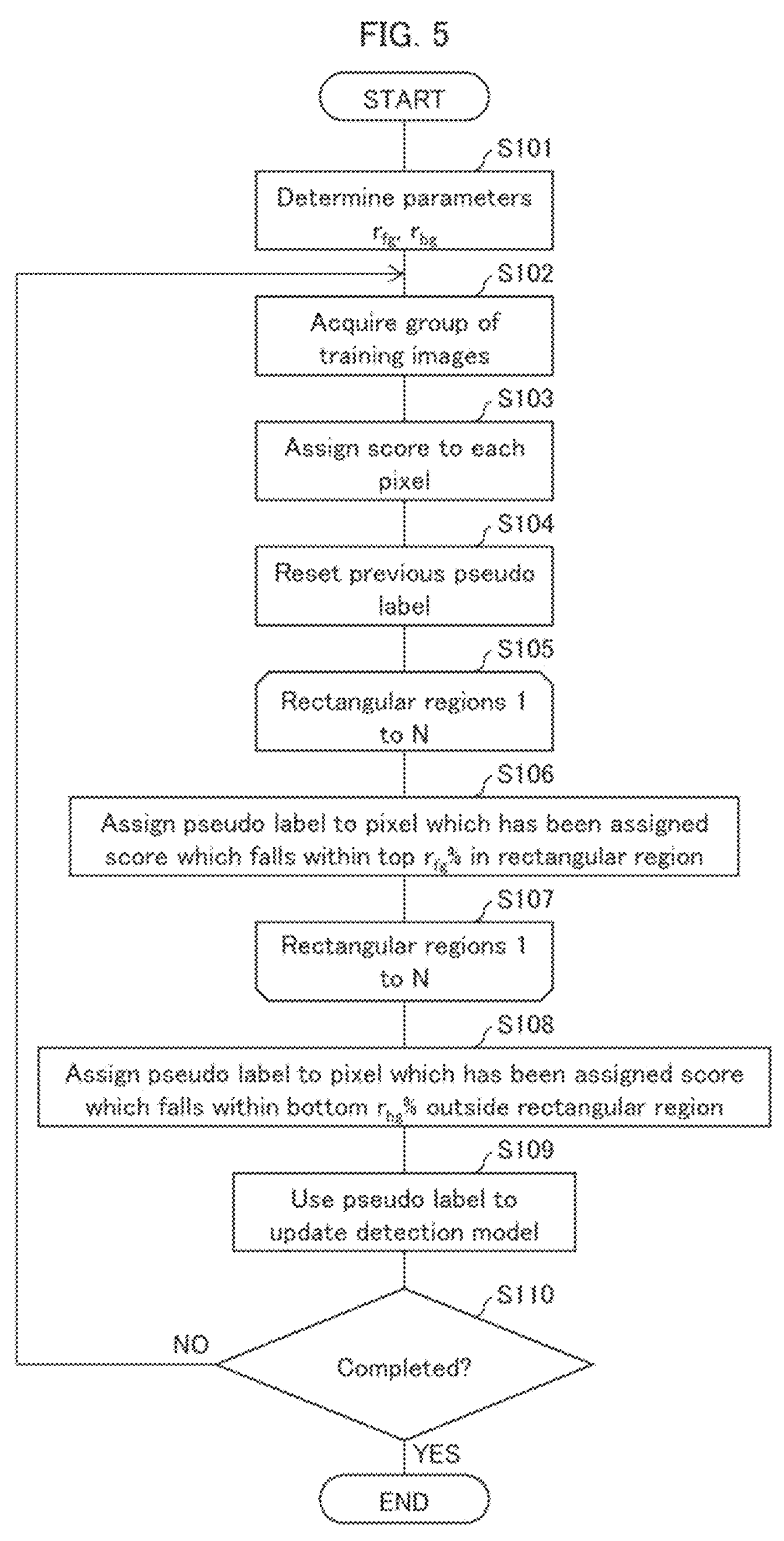
FIG. 5 is a flowchart illustrating a flow of a learning phase execution method in accordance with the second example embodiment.

FIG. 5 is a flowchart illustrating a flow of a learning phase execution method carried out by the information processing apparatus 1A. In the example of FIG. 5, a region (a region having a ground-truth label attached thereto) which contains the image of an object is a rectangular region, and a unit region to which a score is assigned is a pixel. It should be noted that some of the steps included in the flowchart of FIG. 5 may be carried out in parallel with each other or with the order thereof being changed. In the example of FIG. 5, for example, the detection model LM1 to be trained may be a yet-to-be-trained model, or may be a trained model which is generated through machine learning in which training images and ground-truth labels attached to the training images are used.

In step S101, the image acquiring section 11A determines parameters $r_{fg}$ and $r_{bg}$. The parameter $r_{fg}$ is referred to for determination of a pixel to which a pseudo label indicating an object is to be attached. The parameter $r_{bg}$ is referred to for determination of a pixel to which a pseudo label indicating a background is to be attached. In step S102, the image acquiring section 11A acquires a group of training images. In step S103, the region judging section 12A assigns a score to each pixel by inputting the training images to the detection model LM1. In step S104, in a case of previously assigning a pseudo label to each pixel, the pseudo label generating section 13A resets the pseudo label which was previously assigned.

Step S105 is the starting point of loop processing regarding rectangular regions 1 to N, and N (N is an integer satisfying N≥1) is the number of the rectangular regions contained in each of the training images. In step S106, the pseudo label generating section 13A assigns a pseudo label to a pixel which has been assigned a score which falls within the top $r_{fg}$ % in the rectangular region. In other words, the pseudo label generating section 13A assigns the pseudo label which indicates an object, to a unit region having been assigned the score which falls within the range of scores including the highest score, the range corresponding to a predetermined proportion (e.g., the top 90%), in each of the rectangular regions. Step S107 is an end point of the loop processing regarding the rectangular regions 1 to N.

In step S108, the pseudo label generating section 13A assigns a pseudo label to a pixel which has been assigned a score which falls within the bottom $r_{bg}$ % outside the rectangular regions. In step S109, the model training section 14A uses the pseudo label to update the detection model LM1. That is, the model training section 14A updates a model parameter of the detection model LM1 with reference to a region having the pseudo label attached thereto.

In step S110, the completion judging section 15A judges whether the model parameter updating process should be completed. This judgment may be carried out by judging, for example, whether the updating has settled to some degree (e.g., whether the amount of a change caused by the update of the model parameter satisfies a predetermined condition), or may be carried out by judging, for example, whether the number of updates of the model parameter is equal to or greater than a threshold. In a case where the updating process should not be completed (step S110; NO), the completion judging section 15A returns to the process of step S102, and continues the updating process. In a case where the updating process should be completed (step S110; YES), the completion judging section 15A completes the updating process.

(Specific Example of Pseudo Label Assigning Process)

Figure 6:
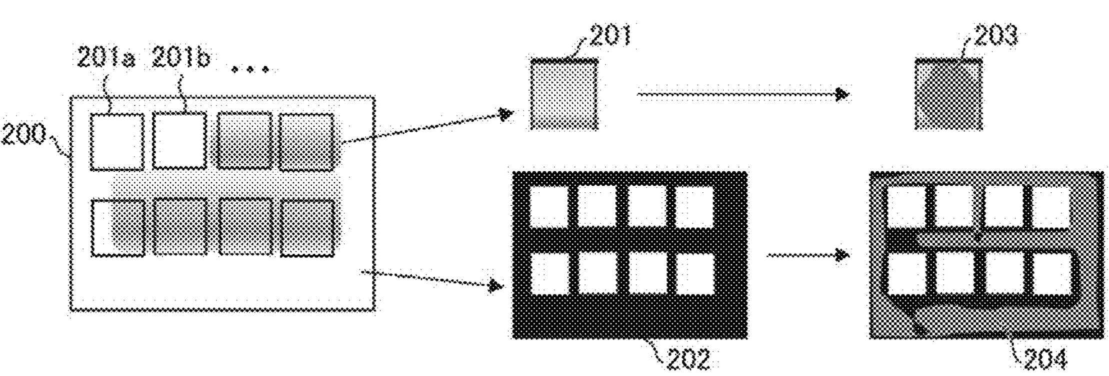
FIG. 6 is a diagram illustrating an example of a region to which a pseudo label is attached in a training image.

FIG. 6 is a diagram illustrating an example of the region to which a pseudo label is attached in a training image. In FIG. 6, a training image 200 contains a plurality of rectangular regions 201*a*, 201*b*, . . . each having a ground-truth label attached thereto, and a region 202 not having the ground-truth label attached thereto. In the following description, in a case where there is no need to individually distinguish among the plurality of rectangular regions 201*a*, 201*b*, . . . , these rectangular regions are referred to as "rectangular regions 201". The pseudo label generating section 13A assigns a pseudo label which indicates an object, to a pixel having been assigned a score which falls within the top $r_{fg}$ % (e.g., the top 90%) in each of the plurality of rectangular regions 201. In addition, the pseudo label generating section 13A assigns a pseudo label indicating a background, to a pixel having been assigned a score which falls within the bottom $r_{bg}$ % (e.g., the bottom 90%) in the region 202 not having a ground-truth label attached thereto.

As illustrated in FIG. 6, a region 203 to which a pseudo label is attached in the rectangular regions 201 is a partial region of the rectangular regions 201, and a region 204 to which a pseudo label is attached in the region 202 is a partial region of the region 202. In particular, pseudo label are not assigned to the vicinities of the boundaries between the rectangular regions 201, each of which has a ground-truth label attached thereto, and the region 202, which is other than the rectangular regions 201.

Figure 7:
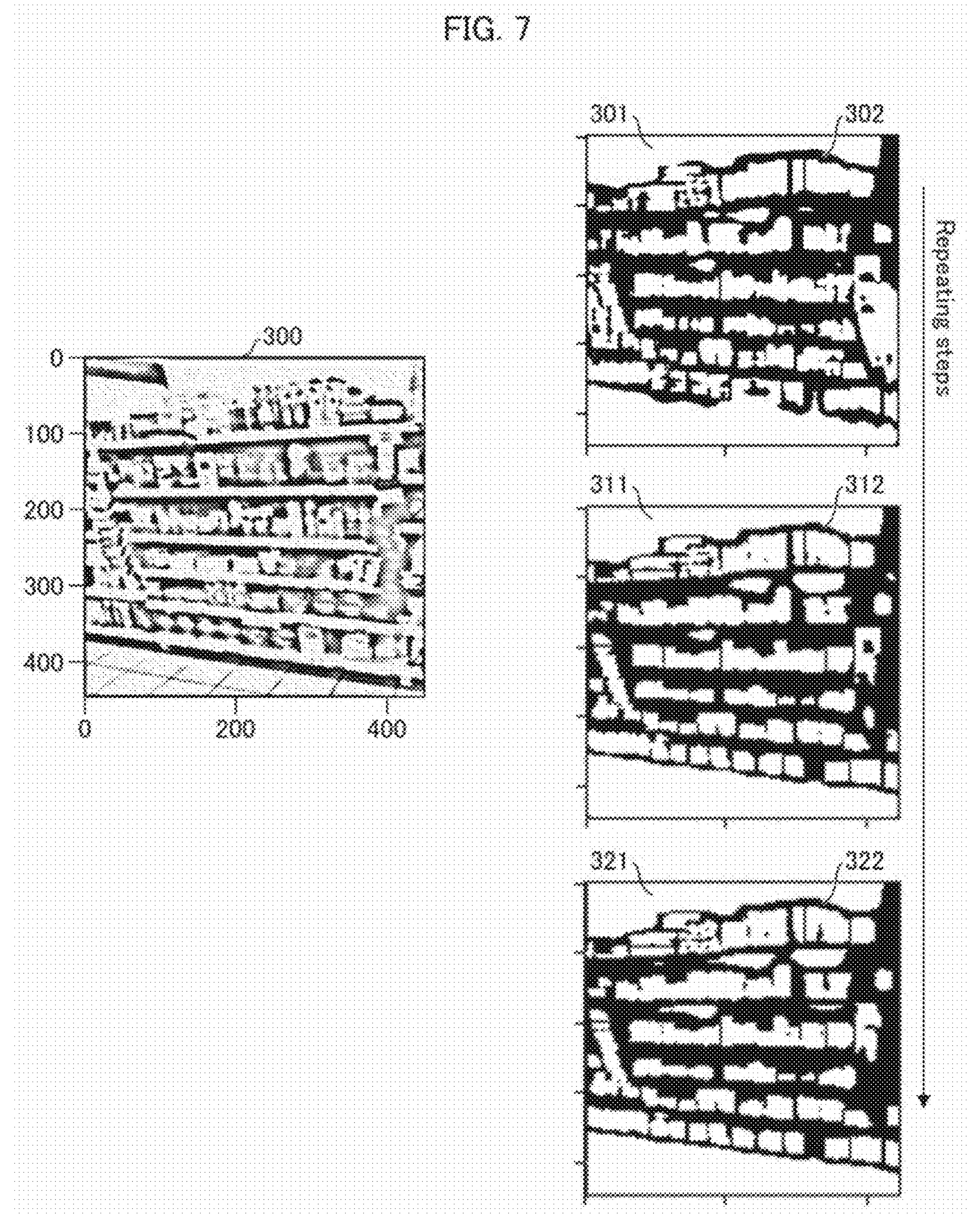
FIG. 7 is a diagram illustrating an example of a change in a region to which a pseudo label is attached in training of a detection model.

FIG. 7 is a diagram illustrating an example of a change in a region to which a pseudo label is assigned in training of the detection model LM1. In FIG. 7, a training image 300 is an image in which a plurality of articles are contained as subjects. Regions 301, 311, and 321 are regions to which the pseudo label generating section 13A has assigned pseudo labels, and regions 302, 312, and 322 are regions to which the pseudo label generating section 13A has not assigned a pseudo label. According to the present example embodiment, the detection model LM1 is trained without use of the parts (such as region 302, 312, or 322) which are the boundaries between the rectangular regions and a region other than the rectangular regions, as illustrated in FIG. 7.

Figure 8:
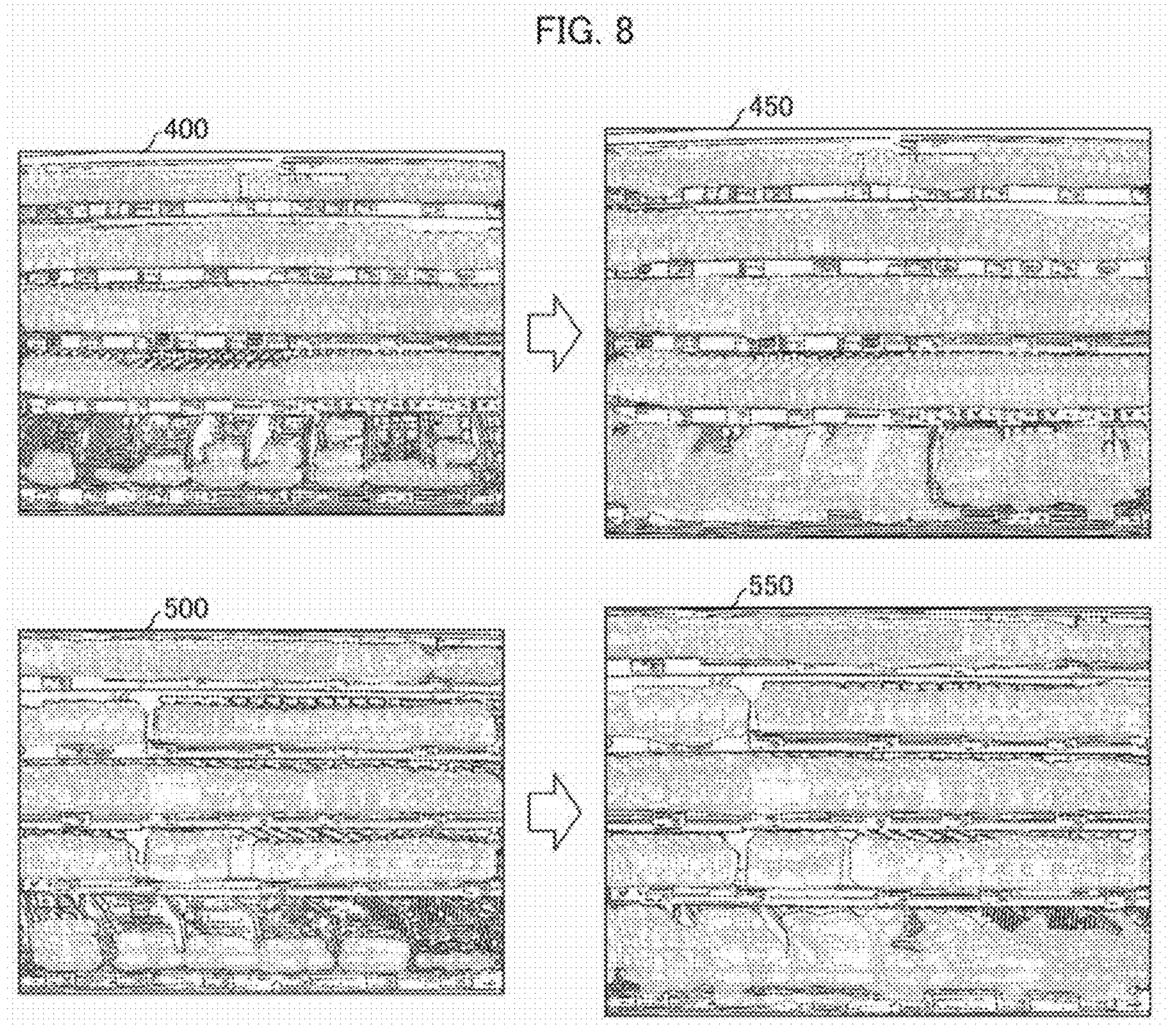
FIG. 8 is a diagram illustrating an example of a detection result provided by a detection model LM1 in accordance with the second example embodiment.

FIG. 8 is a diagram illustrating an example of a detection result provided by the detection model LM1 generated by the information processing apparatus 1A in accordance with the present example embodiment. In FIG. 8, images 400, 450, 500, and 550 are images indicating results of detection of objects in captured images of a store shelf on which commercial products are displayed. Among the images, the images 400 and 500 are images indicating results of detection of objects, the result being provided by a conventional detection model (e.g., a model generated through training in which a ground-truth label attached to a training image is used). An image 450 and an image 550 are views illustrating results of detection of objects, the results being provided by the detection model LM1 model parameters of which have been updated by the information processing apparatus 1A. It can be understood that in the image 400 and the image 500, commercial products located at the back of the store shelf have not been detected as articles, but in the image 450 and the image 550, the commercial products located at the back of the store shelf have been detected as articles. Thus, with the detection model LM1 in accordance with the present example embodiment, it is possible to detect an object which cannot be detected by a conventional detection model. That is, by the information processing apparatus 1A updating a model parameter of the detection model LM1, it is possible to increase the accuracy with which the detection model LM1 detects an object. In particular, according to the present example embodiment, it is possible to increase the accuracy of detection in a depth direction.

(Example Advantages of Information Processing Apparatus)

As above, a configuration employed in the information processing apparatus 1A in accordance with the present example embodiment is such that the pseudo label generating section 13A assigns the pseudo label which indicates an object, to a unit region having been assigned the score which falls within the range of scores including the highest score, the range corresponding to a predetermined proportion, in the region having the ground-truth label attached thereto. That is, the pseudo label generating section 13A does not assign a pseudo label to a low-score region of the region having the ground-truth label attached thereto, and the model training section 14A does not use, for updating of a model parameter, a region not having a pseudo label attached thereto. Thus, the information processing apparatus 1A does not use, for the process of updating a model parameter, a region that is unclear as to which is contained, an object or a background, so that it is possible to reduce mis-learning of a background being learned as an object, even in a case where the background is contained in the region (such as a rectangular region) having a ground-truth label attached thereto, and as a result, provides an example advantage of being capable of increasing the detection accuracy of the detection model LM1 to a greater degree.

A configuration employed in the information processing apparatus 1A in accordance with the present example embodiment is such that the training image contains a plurality of regions each of which contains the image of an object, and the pseudo label generating section 13A assigns the pseudo label which indicates an object, to a unit region having been assigned the score which falls within the range of scores including the highest score, the range corresponding to a predetermined proportion, in each of the regions each containing the image of an object. Thus, the information processing apparatus 1A in accordance with the present example embodiment provides an example advantage of being capable of increasing the detection accuracy of the detection model LM1 to a greater degree, even in a case where a background is contained in a region (such as a rectangular region) having a ground-truth label attached thereto, by not using, for training, a region that is unclear as to which is contained, an object or a background, in each region (such as a rectangular region) which contains the image of an object.

A configuration employed in the information processing apparatus 1A in accordance with the present example embodiment is such that the pseudo label generating section 13A assigns the pseudo label which indicates a background, to a unit region having been assigned the score which falls within the range of scores including the lowest score, the range corresponding to a predetermined proportion, in the region not having the ground-truth label attached thereto. That is, the pseudo label generating section 13A does not assign a pseudo label indicating a background, to a region that is included in the region not having the ground-truth label attached thereto and that has been assigned a high score, and the model training section 14A does not use, for the updating of a model parameter, the region which has not been assigned the pseudo label. As above, by not referring to a region which is unclear as to which is contained, an object or a background, for updating of a model parameter, the information processing apparatus 1A is capable of reducing mis-learning of an object region being learned as a background, even in a case where an object is contained in a region not having the ground-truth label attached thereto, and as a result, an example advantage of being capable of increasing the detection accuracy of the detection model LM1 to a greater degree is obtained.

(Variation 1)

The information processing apparatus 1A in accordance with the second example embodiment uses a training image in which a region containing the image of an object has a ground-truth label attached thereto, to carry out the phase of training the detection model LM1. The ground-truth label attached to the training image is not limited to a label which indicates whether the image is the image of an object, but may be another label. The ground-truth label may be, for example, a class label which indicates the type or the like of an article. In this case, the region judging section 12A assigns a score for each of classes, to each of unit regions contained in the training image. Further, the pseudo label generating section 13A assigns a pseudo label which indicates one of the classes to a partial region of the region having the ground-truth label attached thereto, in accordance with the score assigned to each of the unit regions. That is, the pseudo label generating section 13A assigns a pseudo label of a class to a region which has been assigned a high score regarding the class in the region having the class label attached thereto, and does not assign the pseudo label to a region which has been assigned a low score regarding the class in the region having the class label attached thereto.

In this case, a region which is unclear as to whether the class corresponds to the ground-truth label in the region having the ground-truth label attached thereto is not used for training. Thus, this example aspect makes it possible to, even in a case where the region having the ground-truth label attached thereto contains a region of an object of a class other than the class corresponding to the ground-truth label, reduce mis-learning of the region of the object being learned as the region of the class corresponding to the ground-truth label, and as a result, provides an example advantage of being capable of increasing the detection accuracy of the detection model LM1 to a greater degree.

(Variation 2)

According to the above second example embodiment, the pseudo label generating section 13A assigns, to each rectangular region, a pseudo label which indicates an article, to a pixel having been assigned a score which falls within the top $r_{fg}$ %, as illustrated in steps S105 to S107 of FIG. 5. The process of the pseudo label generating section 13A assigning a pseudo label which indicates an article is not limited to the above example, but the pseudo label generating section 13A may assign the pseudo label which indicates an article, by another method. For example, the pseudo label generating section 13A may assign the pseudo label which indicates an article, to a pixel having been assigned a score which falls within the top $r_{fg}$ % determined when all the pixels each having a ground-truth label attached thereto are sorted by the score, without individually distinguishing among the plurality of rectangular regions.

Third Example Embodiment

The following description will discuss a third example embodiment of the present invention in detail, with reference to the drawings. A composition which has the same function as the composition described in the first and second example embodiments is assigned the same reference, and the description thereof is not repeated.

(Configuration of Information Processing Apparatus)

Figure 9:
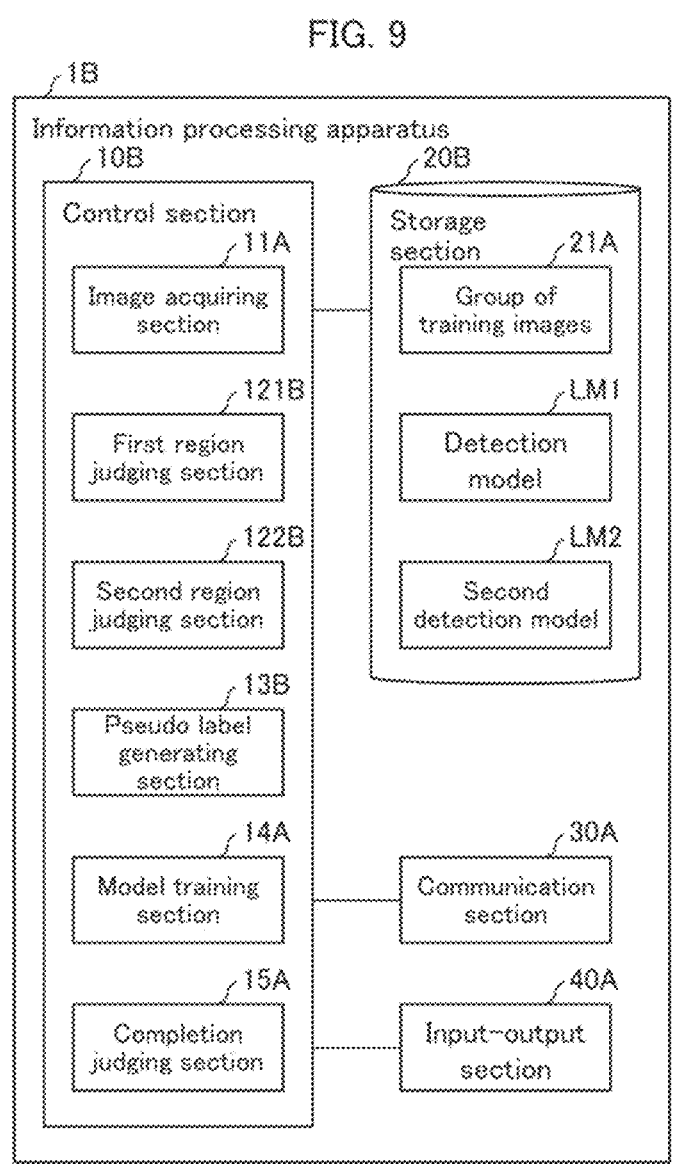

FIG. 9 is a block diagram illustrating a configuration of an information processing apparatus 1B in accordance with the third example embodiment. The information processing apparatus 1B includes a control section 10B, a storage section 20B, a communication section 30A, and input-output section 40A.

The control section 10B performs overall control of the sections of the information processing apparatus 1B. The control section 10B includes an image acquiring section 11A, a first region judging section 121B, a second region judging section 122B, a pseudo label generating section 13B, a model training section 14A, and a completion judging section 15A. The first region judging section 121B is an example of the score assigning means in accordance with the present specification. The second region judging section 122B is an example of the identification label attaching means in accordance with the present specification. In addition, the pseudo label generating section 13B is an example of the first pseudo label assigning means, the second pseudo label assigning means, and the threshold determining means in accordance with the present specification.

Processes carried out by the first region judging section 121B are the same as the processes carried out by the region judging section 12A in accordance with the second example embodiment. That is, the first region judging section 121B assigns, to each of unit regions, a score which indicates objectness, by inputting the training image to a detection model LM1. The score indicates that the greater the value of the score, the higher the possibility of being an object, and the smaller the value of the score, the higher the possibility of being a background. The unit regions are, for example, pixels.

The second region judging section 122B assigns, to each of the unit regions contained in a region having a ground-truth label attached thereto, an identification label indicating an object or a background, by inputting at least a part of the training image to a second detection model LM2 for detecting, in an image, a region corresponding to the image of an object.

The second detection model LM2 is a model for detecting an object region in an image, and is a trained model generated through machine learning. The second detection model LM2 is, as an example, a model having high accuracy with which an object region is detected in the region (such as a rectangular region) having a ground-truth label attached thereto. The second detection model LM2 is an example of the second region detection model in accordance with the present specification. The scheme for the machine learning of the second detection model LM2 is not limited, but examples thereof may include, but not limited to, semantic segmentation or instance segmentation (such as U-Net, FCN, DeepLab v3+). An input to the second detection model LM2 in an inference phase includes image data which represents an image, and an output from the second detection model LM2 includes information representing an object region.

The pseudo label generating section 13B assigns a pseudo label to the unit regions contained in the training image, in accordance with the score assigned by the first region judging section 121B to each unit region and the identification label assigned by the second region judging section 122B. Details of the process carried out by the pseudo label generating section 13B will be described later.

(Flow of Learning Phase Execution Method)

Figure 10:
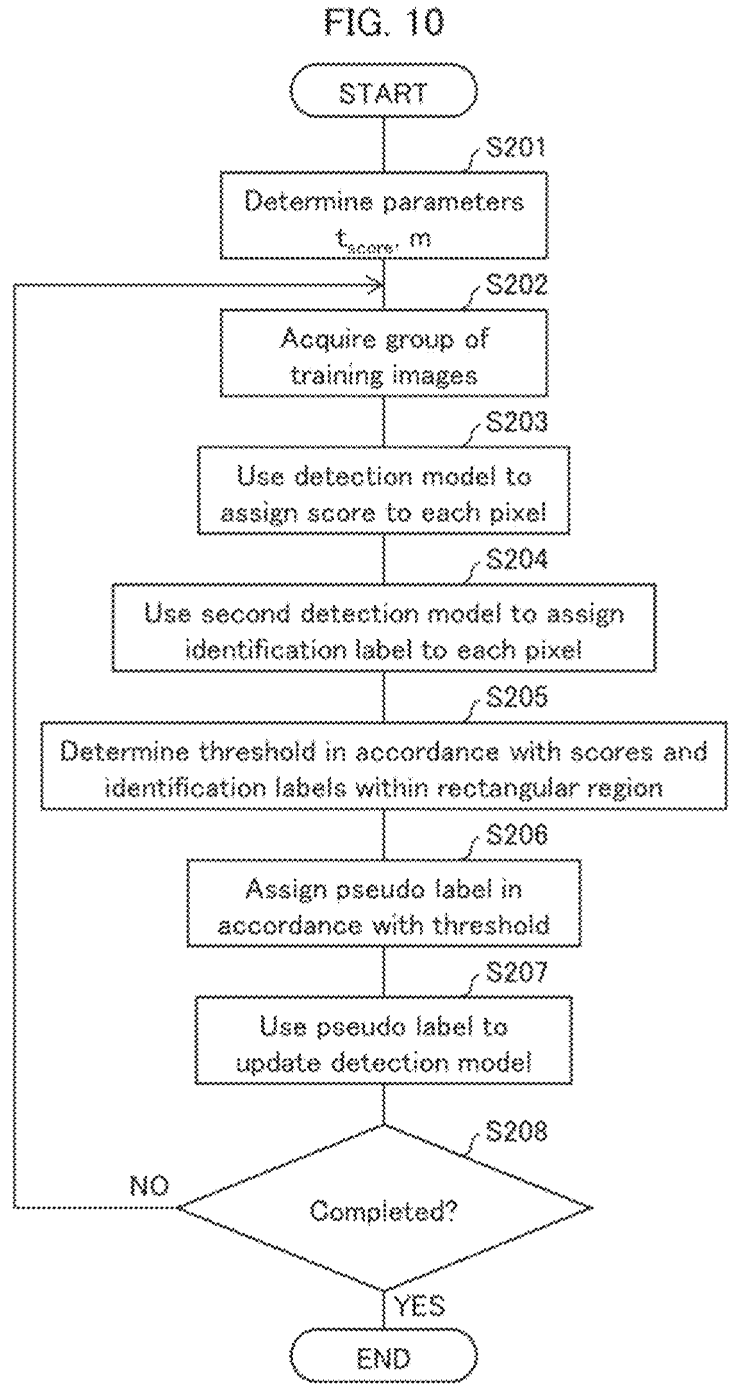
FIG. 10 is a flowchart illustrating an example of a flow of a learning phase execution method in accordance with the third example embodiment.

FIG. 10 is a flowchart illustrating an example of a flow of a learning phase execution method carried out by the information processing apparatus 1B. In the example of FIG. 10, a region having a ground-truth label attached thereto is a rectangular region, and a unit region to which a score is to be attached is a pixel. It should be noted that some of the steps included in the flowchart of FIG. 10 may be carried out in parallel with each other or in another sequence. Further, in the example of FIG. 10, the detection model LM1 to be trained is, as an example, a trained model having been trained by the learning phase execution method of FIG. 5 in accordance with the second example embodiment. In addition, the detection model LM1 may be, for example, a yet-to-be-trained model, or may be a trained model generated through machine learning in which a training image and a ground-truth label attached to the training image are used.

In step S201, the image acquiring section 11A determines a threshold $t_{score}$ and a margin m (m≥0), which are parameters. The threshold $t_{score}$ is referred to in the second region judging section 122B assigning an identification label with use of the second detection model LM2. Details of a process of the second region judging section 122B assigning an identification label to each pixel will be described later. The margin m is referred to in the pseudo label generating section 13B assigning a pseudo label to each pixel. Details of a process of the pseudo label generating section 13B assigning a pseudo label to each pixel will be described later.

In step S202, the image acquiring section 11A acquires a group of training images. In step S203, the first region judging section 121B uses the detection model LM1 to assign a score to each pixel. The score assigned by the first region judging section 121B indicates objectness, as described above, and indicates that the greater the value of the score, the higher the possibility of being an object, and the smaller the value of the score, the smaller the possibility of being an object.

In step S204, the second region judging section 122B uses the second detection model LM2 to assign an identification label to each pixel. The second region judging section 122B assigns an identification label which indicates whether the image is the image of an object or the image of a background, by, as an example, calculating, for each pixel, a score which indicates objectness and comparing the calculated score with the threshold $t_{score}$. The score indicates that the greater the value of the score, the higher the possibility of being an object, and the smaller the value of the score, the smaller the possibility of being an object.

In step S205, the pseudo label generating section 13B determines a threshold in accordance with a score distribution (a distribution of scores calculated with use of the detection model LM1) of the pixels each having attached thereto the identification label which indicates an object and a score distribution (a distribution of scores calculated with use of the detection model LM1) of the pixels each having attached thereto the identification label which indicates a background. More specifically, as an example, the pseudo label generating section 13B determines, in accordance with the scores (scores calculated with use of the detection model LM1) and the identification labels within the rectangular region, a first threshold and a second threshold, which are thresholds referred to in assigning a pseudo label. In this respect, the first threshold is referred to for the pseudo label generating section 13B to assign a pseudo label which indicates an object. The second threshold is referred to for the pseudo label generating section 13B to assign a pseudo label which indicates a background.

As an example, the pseudo label generating section 13B uses, as the first threshold, a value obtained by adding a predetermined value (margin m) to the average of the center of gravity of the score distribution of the unit regions each having attached thereto the identification label indicating an object and the center of gravity of the score distribution of the unit regions each having attached thereto the identification label indicating a background, and uses, as the second threshold, a value obtained by subtracting the predetermined value (margin m) from the average.

Figure 11:
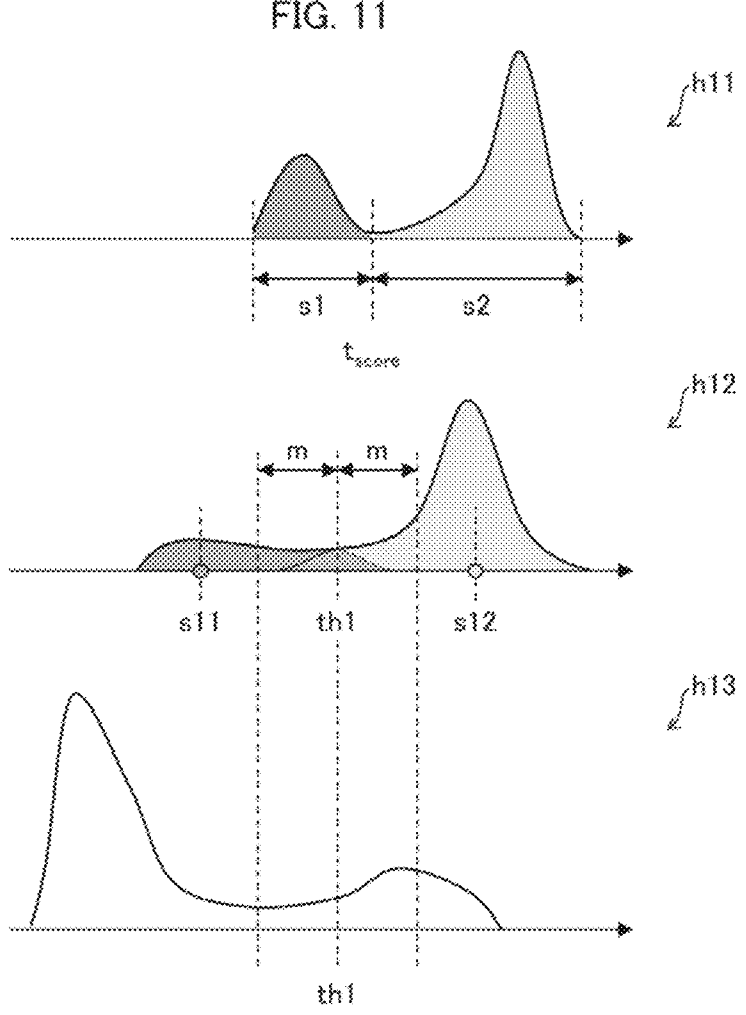
FIG. 11 is a diagram illustrating a specific example of a threshold determination method in accordance with the third example embodiment.

FIG. 11 is a diagram illustrating a specific example of a threshold determination method. In FIG. 11, a histogram h11 represents a distribution of scores assigned by the second detection model LM2 to the pixels contained in the rectangular region having a ground-truth label attached thereto. The horizontal and vertical axes of the histogram h11 represent a score assigned by the second detection model LM2 and the number of pixels, respectively. By the second region judging section 122B carrying out step S204, an identification label which indicates an object is assigned to each of pixels (pixels having scores which fall within a range s2 of FIG. 11) having scores which are equal to or greater than the threshold $t_{score}$ in the histogram h11. Further, an identification label which indicates a background is assigned to each of pixels (pixels having scores which fall within a range s1) having scores which are smaller than the threshold $t_{score}$ is assigned.

Further, FIG. 11 includes a histogram h12 which represents a distribution of scores assigned by the first region judging section 121B to the pixels contained in the rectangular region having a ground-truth label attached thereto. The horizontal and vertical axes of the histogram h12 represent a score and the number of pixels, respectively. A comparison between the histogram h11 and the histogram h12 shows that in histogram h11, the pixels having been assigned the identification labels which indicate an object and the pixels having been assigned the identification labels which indicate a background are separated from each other to some degree, whereas in histogram h12, the boundary between the former and the latter is not clear, and there is a mixed area of the former and the latter.

FIG. 11 further includes a histogram h13 which represents a distribution of scores assigned by the first region judging section 121B to each of the pixels of the region not having the ground-truth label attached thereto. The horizontal and vertical axes of the histogram h13 represent a score and the number of pixels, respectively.

In the example of FIG. 11, the pseudo label generating section 13B calculates an average th1 of the center of gravity s11 of the score distribution of the pixels having attached thereto the identification labels which indicate an object, the center of gravity s12 of the score distribution of the unit regions having attached thereto the identification labels which indicate a background, to calculate the first threshold (th1+m) and the second threshold (th1−m). However, the method for calculating the first threshold and the second threshold is not limited to the above example, but the pseudo label generating section 13B may calculate the thresholds by another method.

In step S206 of FIG. 10, the pseudo label generating section 13B assigns a pseudo label which indicates an object, to a unit region having the score (score calculated by the first region judging section 121B) equal to or greater than the above threshold in the training image, and further assigns a pseudo label which indicates a background, to a unit region having the score (score calculated by the first region judging section 121B) smaller than the first threshold or the second threshold, which is smaller than the first threshold in the training image. A pseudo label assigning process carried out by the pseudo label generating section 13B will be described later.

In step S207 of FIG. 10, the model training section 14A uses the pseudo label to update the detection model LM1. That is, the model training section 14A uses the pseudo label to update a model parameter of the detection model LM1.

In step S208, the completion judging section 15A judges whether the model parameter updating process should be completed. This judgment may be carried out by judging, for example, whether the updating has settled to some degree (e.g., whether the amount of a change caused by the update of the model parameter satisfies a predetermined condition), or may be carried out by judging, for example, whether the number of updates of the model parameter is equal to or greater than a threshold. In a case where the updating process should not be completed (step S208; NO), the completion judging section 15A returns to processing of step S202, and continues the updating process. In a case where the updating process should be completed (step S208; YES), the completion judging section 15A completes the updating process.

(Specific Examples of Pseudo Label Assigning Process)

Here are descriptions of specific examples of respective processes of assigning a pseudo label which indicates an object and assigning a pseudo label which indicates a background, the processes being carried out by the pseudo label generating section 13B.

((i) Specific Example 1 of Process of Pseudo Label which Indicates Object)

As an example, the pseudo label generating section 13B assigns the pseudo label which indicates an object, to a partial region of the region having attached thereto a ground-truth label, in accordance with the score calculated by the first region judging section 121B and assigned to each of the unit regions, and further assigns the pseudo label which indicates an object, to a partial region of the region not having the ground-truth label attached thereto, in accordance with the score calculated by the first region judging section 121B and assigned to each of the unit regions. In this case, in the example of FIG. 11, the pseudo label generating section 13B assigns pseudo labels which indicate an object, to a pixel having a score equal to or greater than the first threshold (th1+m) in the histogram h12 and a pixel having a score equal to or greater than the first threshold (th1+m) in the histogram h13.

((ii) Specific Example 2 of Process of Pseudo Label which Indicates Object)

As an example, the pseudo label generating section 13B assigns the pseudo label which indicates an object, to a partial region of the region having the ground-truth label attached thereto, in accordance with the score calculated by the first region judging section 121B and assigned to each of the unit regions. More specifically, as an example, the pseudo label generating section 13B assigns the pseudo label which indicates an object, to a unit region having the score which is calculated by the first region judging section 121B and which is equal to or greater than the first threshold in the region having the ground-truth label attached thereto. In the example of FIG. 11, the pseudo label generating section 13B assigns the pseudo label which indicates an object, to a pixel having a score equal to or greater than the first threshold (th1+m) in the histogram h12.

In this case, regarding the region not having the ground-truth label attached thereto, the pseudo label generating section 13B may carry out a process of assigning a pseudo label which indicates a background, by the same method as in the second example embodiment.

((iii) Specific Example 1 of Process of Assigning Pseudo Label which Indicates Background)

The pseudo label generating section 13B may assign the pseudo label which indicates a background, to a partial region of the region not having a ground-truth label attached thereto, in accordance with the score calculated by the first region judging section 121B and assigned to each of the unit regions, and further assign the pseudo label which indicates a background, to a partial region of the region having the ground-truth label attached thereto, in accordance with the score calculated by the first region judging section 121B and assigned to each of the unit regions. More specifically, as an example, the pseudo label generating section 13B assigns the pseudo label which indicates a background, to a unit region of the region not having the ground-truth label attached thereto and the region having the ground-truth label attached thereto, the unit region having the score smaller than the second threshold. In this case, in the example of FIG. 11, the pseudo label generating section 13B assigns pseudo labels which indicate an object, to a pixel having the score smaller than the second threshold (th1−m) in the histogram h13 and to a pixel having the score smaller than the second threshold (th1−m) in the histogram h12.

((iv) Specific Example 2 of Process of Assigning Pseudo Label which Indicates Background)

As an example, the pseudo label generating section 13B assigns the pseudo label which indicates a background, to a unit region having the score which is calculated by the first region judging section 121B and which is smaller than the second threshold in the region not having the ground-truth label attached thereto. In this case, in the example of FIG. 11, the pseudo label generating section 13B assigns the pseudo label which indicates a background, to a pixel having the score smaller than the second threshold (th1−m) in the histogram h13.

In this case, regarding the region having the ground-truth label attached thereto, the pseudo label generating section 13B may carry out a process of assigning a pseudo label which indicates an object, by the same method as in the second example embodiment.

Figure 12:
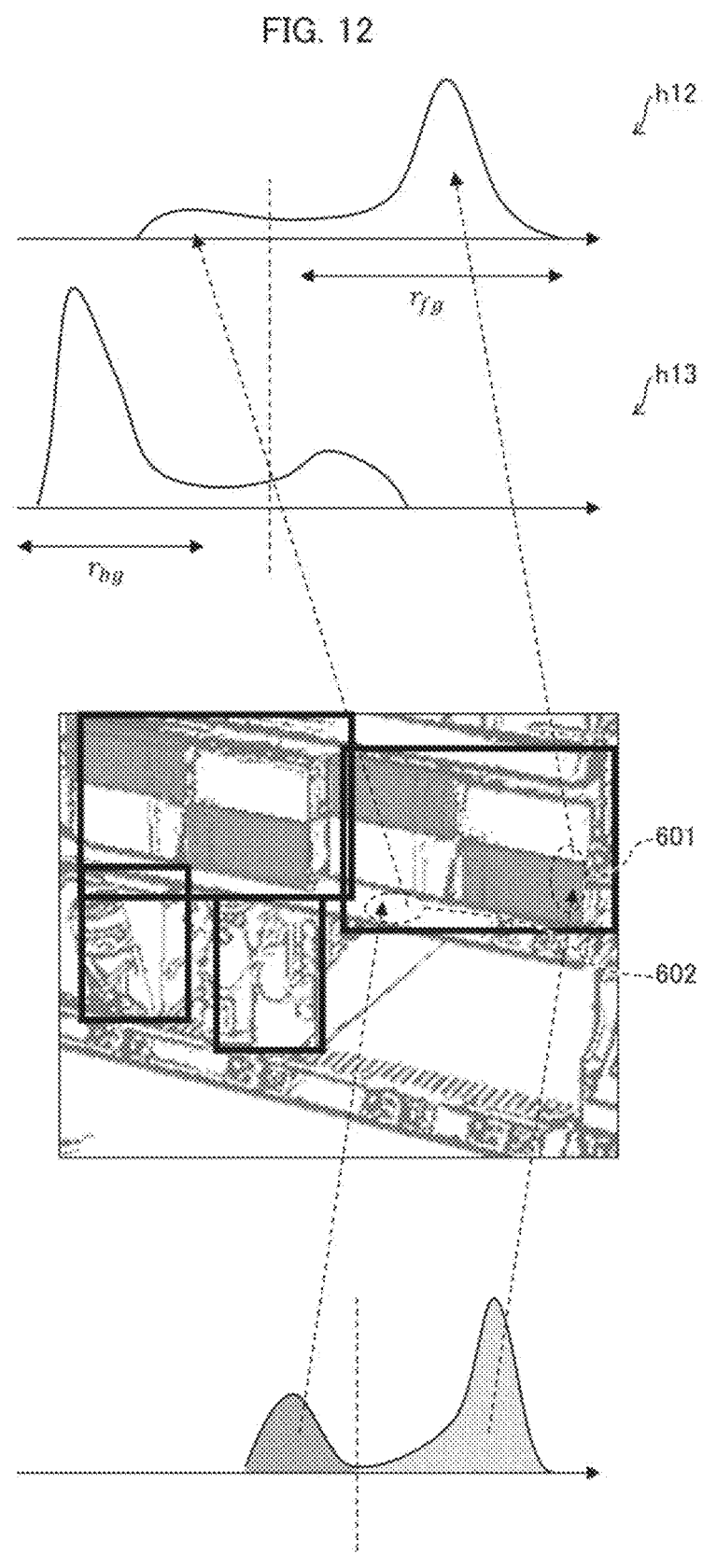

FIG. 12 is a diagram illustrating a specific example of the region to which a pseudo label is to be attached in a training image. The histograms h12 and h13 in the upper part of FIG. 12 are the same as the histograms h12 and h13 of FIG. 11. According to the second example embodiment, pseudo labels which indicate an object are assigned to pixels which are included in a rectangular region having a ground-truth label attached thereto and which fall within the top $r_{fg}$ %. In contrast, in the example of FIG. 12, a pseudo label which indicates an object is attached to a region (e.g., region 601) which is included in the rectangular region having a ground-truth label attached thereto and which has a relatively high score, and further assigns a pseudo label which indicates a background to a region (e.g., region 602) which is included in the rectangular region having a ground-truth label attached thereto and which has a relatively low score. Thus, according to the present example embodiment, it is possible to conduct training in which a training image is used more efficiently.

(Example Advantages of Information Processing Apparatus)

As above, a configuration employed in the information processing apparatus 1B in accordance with the present example embodiment is such that the pseudo label generating section 13B assigns the pseudo label which indicates an object, to a partial region of the region having the ground-truth label attached thereto, in accordance with the score assigned to each of the unit regions, and further assigns the pseudo label which indicates an object, to a partial region of the region not having the ground-truth label attached thereto, in accordance with the score assigned to each of the unit regions. Therefore, with the information processing apparatus 1B in accordance with the present example embodiment, it is possible to more efficiently use a training image by using, as an object region, a region which is included in the region not having the ground-truth label attached thereto and which has a high score, to train the detection model LM1.

A configuration employed in the information processing apparatus 1B in accordance with the present example embodiment is such that a second region judging section 122B is included which assigns an identification label which indicates whether the image is the image of an object or the image of a background, to each of the unit regions contained in the region having the ground-truth label attached thereto, by inputting at least a part of the training image to a second detection model LM2 for detecting, in an image, a region corresponding to the image of an object, and the pseudo label generating section 13B determines a threshold in accordance with a score distribution of the unit regions each having attached thereto the identification label which indicates an object and a score distribution of the unit regions each having attached thereto the identification label which indicates a background, assigns a pseudo label which indicates an object, to a unit region having the score equal to or greater than the threshold in the training image, and further assigns a pseudo label which indicates a background, to a unit region having the score smaller than the threshold or a second threshold smaller than the threshold, in the training image.

Therefore, the information processing apparatus 1B in accordance with the present example embodiment makes it possible to more accurately assign a pseudo label by assigning the pseudo label with use of the detection result provided by the second detection model LM2, which differs from the detection model LM1, and as a result, provides an example advantage of being capable of assigning the pseudo label, and as a result, it is possible to increase the detection accuracy of the detection model LM1 to a greater degree. For example, by using, as the second detection model LM2, a model capable of more accurately judging a boundary between regions, it is possible to increase the detection accuracy of the detection model LM1 to a greater degree.

A configuration employed in the information processing apparatus 1B in accordance with the present example embodiment is such that the pseudo label generating section 13B uses, as the threshold, a value obtained by adding a predetermined value to the average of the center of gravity of the score distribution of the unit regions each having attached thereto the identification label which indicates an object and the center of gravity of the score distribution of the unit regions each having attached thereto the identification label which indicates a background, and uses, as the second threshold, a value obtained by subtracting the predetermined value from the average, to assign the pseudo label which indicate a background, to a unit region having the score smaller than the second threshold in the training image. Therefore, the information processing apparatus 1B in accordance with the present example embodiment makes it possible to more accurately assign a pseudo label by assigning the pseudo label with use of a threshold calculated in accordance with the detection result provided by the second detection model LM2, and as a result, provides an example advantage of being capable of increasing the detection accuracy of the detection model LM1 to a greater degree.

A configuration employed in the information processing apparatus 1B in accordance with the present example embodiment is such that the pseudo label generating section 13B assigns the pseudo label which indicates a background, to a partial region of the region not having the ground-truth label attached thereto, in accordance with the score assigned to each of the unit regions, and further assigns the pseudo label which indicates a background, to a partial region of the region having the ground-truth label attached thereto, in accordance with the score assigned to each of the unit regions. Therefore, with the information processing apparatus 1B in accordance with the present example embodiment, it is possible to more efficiently use a training image by using, as a background region, a region that is included in the region which has the ground-truth label attached thereto in a training image and which has a low score, to train the detection model LM1.

Fourth Example Embodiment

The following description will discuss a fourth example embodiment of the present invention in detail, with reference to the drawings. A composition which has the same function as the composition described in the first to third example embodiments is assigned the same reference, and the description thereof is not repeated.

Figures 13, 14:
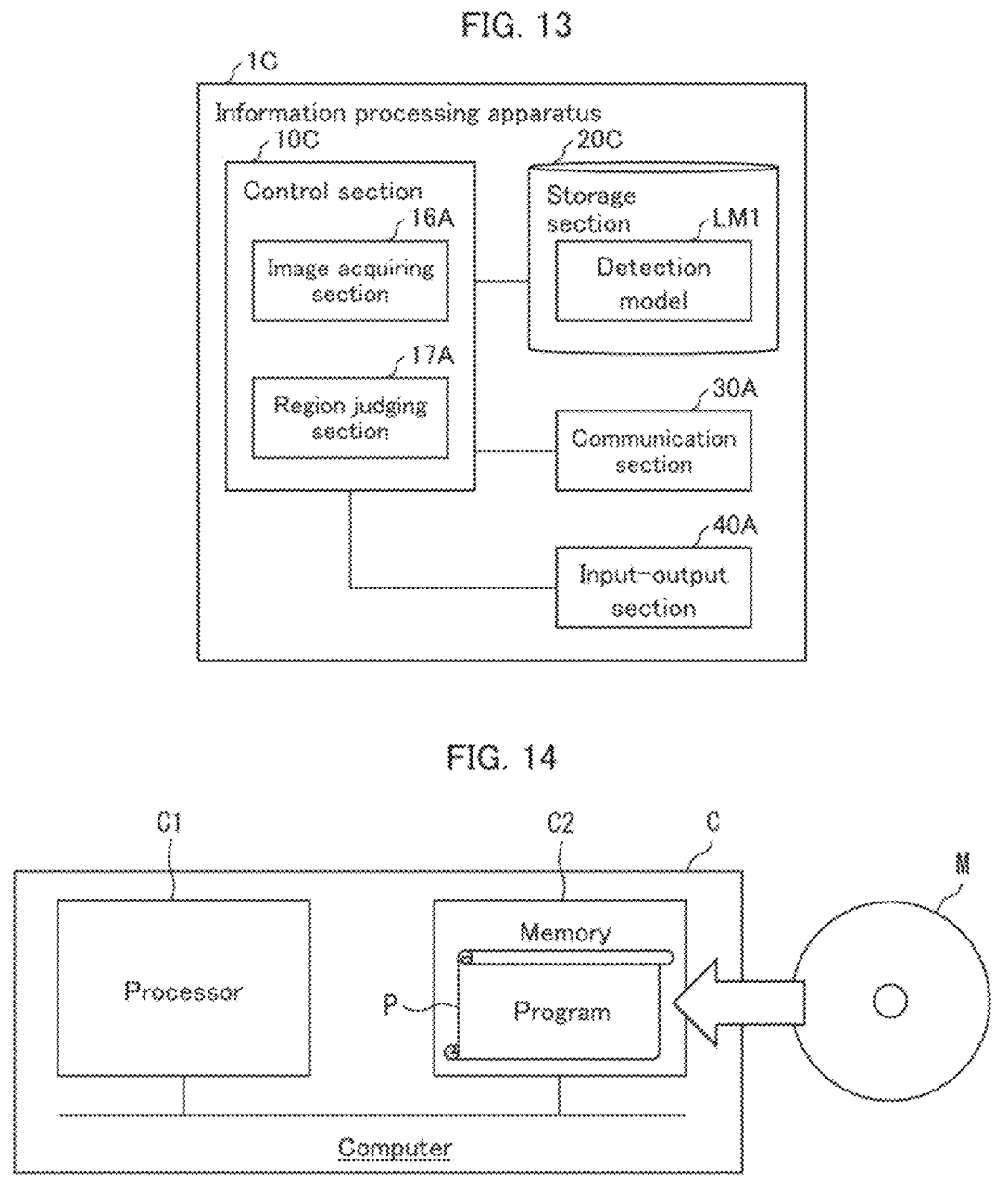

FIG. 13 is a block diagram illustrating a configuration of an information processing apparatus 1C in accordance with the fourth example embodiment. The information processing apparatus 1C includes a control section 10C, a storage section 20C, a communication section 30A, and input-output section 40A. The control section 10C performs overall control of the sections of the information processing apparatus 1C. The control section 10C includes an image acquiring section 16A and a region detecting section 17A. The region detecting section 17A is an example of the detecting means in accordance with the present specification. The image acquiring section 16A acquires an image to be subjected to object detection. The region detecting section 17A detects an object region contained in the image, by inputting, to a detection model LM1, the image acquired by the image acquiring section 16A.

As above, a configuration employed in the information processing apparatus 1C in accordance with the present example embodiment is such that by inputting an image to the detection model LM1, an object region contained in the image is detected. Therefore, the information processing apparatus 1C in accordance with the present example embodiment provides an example advantage of being capable of accurately detecting an object region in an image.

Software Implementation Example

Some or all of the functions of the information processing apparatuses 1, 1A, 1B, and 1C may be implemented by hardware such as an integrated circuit (IC chip), or may be implemented by software.

In the latter case, the information processing apparatuses 1, 1A, 1B, and 1C are provided by, for example, a computer that executes instructions of a program that is software implementing the foregoing functions. An example (hereinafter, computer C) of such a computer is illustrated in FIG. 14. The computer C includes at least one processor C1 and at least one memory C2. The memory C2 has stored therein a program P for causing the computer C to operate as the information processing apparatuses 1, 1A, 1B, and 1C. The at least one processor C1 of the computer C retrieves the program P from the memory C2 and executes the program P, so that the functions of the information processing apparatuses 1, 1A, 1B, and 1C are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted through a transmission medium. Examples of such a transmission medium can include a communication network and a broadcast wave. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the above example embodiments.

Additional Remark 2

The whole or part of the example embodiments disclosed above can be described as, but not limited to, the following supplementary notes.

(Supplementary Note 1)

An information processing apparatus including: an acquiring means for acquiring a training image in which a region containing an image of an object has a ground-truth label attached thereto; a score assigning means for assigning, to each of unit regions, a score which indicates objectness, by inputting the training image to a region detection model for detecting, in an image, a region corresponding to an image of an object; a first pseudo label assigning means for assigning a pseudo label which indicates an object, to a partial region of the region having the ground-truth label attached thereto, in accordance with the score assigned to each of the unit regions; a second pseudo label assigning means for assigning a pseudo label which indicates a background, to a partial region of a region not having the ground-truth label attached thereto, in accordance with the score assigned to each of the unit regions; and an updating means for updating a model parameter of the region detection model, with reference to a region having attached thereto the pseudo label which indicates an object or the pseudo label which indicates a background.

(Supplementary Note 2)

The information processing apparatus described in supplementary note 1, in which the first pseudo label assigning means is configured to assign the pseudo label which indicates an object, to a unit region having been assigned the score that falls within a range of scores including a highest score, the range corresponding to a predetermined proportion, in the region having the ground-truth label attached thereto.

(Supplementary Note 3)

The information processing apparatus described in supplementary note 2, in which the training image contains a plurality of regions each being the region containing an image of an object, and the first pseudo label assigning means is configured to assign the pseudo label which indicates an object, to the unit region having been assigned the score that falls within a range of scores including a highest score, the range corresponding to a predetermined proportion, in each of the plurality of regions each of which contains an image of an object.

(Supplementary Note 4)

The information processing apparatus described in any one of supplementary notes 1 to 3, in which the second pseudo label assigning means is configured to assign the pseudo label which indicates a background, to a unit region having been assigned the score that falls within a range of scores including a lowest score, the range corresponding to a predetermined proportion, in the region not having the ground-truth label attached thereto.

(Supplementary Note 5)

The information processing apparatus described in any one of supplementary notes 1 to 4, in which the ground-truth label is a class label, the score assigning means is configured to assign a score for each of classes, to each of the unit regions contained in the training image, and the first pseudo label assigning means is configured to assign a pseudo label which indicates one of the classes, to the partial region of the region having the ground-truth label attached thereto, in accordance with the score assigned to each of the unit regions.

(Supplementary Note 6)

The information processing apparatus described in any one of supplementary notes 1 to 5, in which the first pseudo label assigning means is configured to: assign the pseudo label which indicates an object, to the partial region of the region having the ground-truth label attached thereto, in accordance with the score assigned to each of the unit regions; and further assign the pseudo label which indicates an object, to the partial region of the region not having the ground-truth label attached thereto, in accordance with the score assigned to each of the unit regions.

(Supplementary Note 7)

The information processing apparatus described in supplementary note 6, further including: an identification label assigning means for assigning, to each of the unit regions contained in the region having the ground-truth label attached thereto, an identification label which indicates an object or a background, by inputting at least a part of the training image to a second region detection model for detecting, in an image, a region corresponding to an image of an object; and a threshold determining means for determining a threshold in accordance with a score distribution of the unit regions each having attached thereto the identification label which indicates an object and a score distribution of the unit regions each having attached thereto the identification label which indicates a background, and the first pseudo label assigning means is configured to assign the pseudo label which indicates an object, to a unit region having been assigned the score which is equal to or greater than the threshold in the training image, and the second pseudo label assigning means is configured to assign the pseudo label which indicates a background, to a unit region having been assigned the score which is smaller than the threshold or a second threshold smaller than the threshold in the training image.

(Supplementary Note 8)

The information processing apparatus described in supplementary note 7, in which the threshold determining means is configured to use, as the threshold, a value obtained by adding a predetermined value to an average of a center of gravity of the score distribution of the unit regions each having attached thereto the identification label which indicates an object and a center of gravity of the score distribution of the unit regions each having attached thereto the identification label which indicates a background, and use, as the second threshold, a value obtained by subtracting the predetermined value from the average, and the second pseudo label assigning means is configured to assign the pseudo label which indicates a background, to a unit region having been assigned the score which is smaller than the second threshold in the training image.

(Supplementary Note 9)

An information processing method including: at least one processor acquiring a training image in which a region containing an image of an object has a ground-truth label attached thereto; the at least one processor assigning, to each of unit regions, a score which indicates objectness, by inputting the training image to a region detection model for detecting, in an image, a region corresponding to an image of an object; the at least one processor assigning a pseudo label which indicates an object, to a partial region of the region having the ground-truth label attached thereto, in accordance with the score assigned to each of the unit regions; the at least one processor assigning a pseudo label which indicates a background, to a partial region of a region not having the ground-truth label attached thereto, in accordance with the score assigned to each of the unit regions; and the at least one processor updating a model parameter of the region detection model, with reference to a region having attached thereto the pseudo label which indicates an object or the pseudo label which indicates a background.

(Supplementary Note 10)

A program for causing a computer to carry out: a process of acquiring a training image in which a region containing an image of an object has a ground-truth label attached thereto; a process of assigning, to each of unit regions, a score which indicates objectness, by inputting the training image to a region detection model for detecting, in an image, a region corresponding to an image of an object; a process of assigning a pseudo label which indicates an object, to a partial region of the region having the ground-truth label attached thereto, in accordance with the score assigned to each of the unit regions; a process of assigning a pseudo label which indicates a background, to a partial region of a region not having the ground-truth label attached thereto, in accordance with the score assigned to each of the unit regions; and a process of updating a model parameter of the region detection model, with reference to a region having attached thereto the pseudo label which indicates an object or the pseudo label which indicates a background.

(Supplementary Note 11)

The information processing apparatus described in any one of supplementary notes 1 to 6, in which the second pseudo label assigning means is configured to: assign the pseudo label which indicates a background, to the partial region of the region not having the ground-truth label attached thereto, in accordance with the score assigned to each of the unit regions; and further assign the pseudo label which indicates a background, to the partial region of the region having the ground-truth label attached thereto, in accordance with the score assigned to each of the unit regions.

(Supplementary Note 12)

A region detection model for detecting, in an image, a region corresponding to an image of an object, the region detection model being generated through machine learning in which the following (i) and (ii) are used: (i) a pseudo label which indicates an object and which is attached to a partial region in a training image in which a region containing an image of an object has a ground-truth label attached thereto, the partial region being included in the region having the ground-truth label attached thereto and having a score which indicates objectness and which satisfies a first condition; and (ii) a pseudo label which indicates a background and which is attached to a partial region in the training image, the partial region being included in a region not having the ground-truth label attached thereto and having the score which satisfies a second condition.

(Supplementary Note 13)

A region detection apparatus including a detecting means for detecting an object region contained in an image, by inputting the image to the region detection model described in supplementary note 12.

(Supplementary Note 14)

An information processing system including: an acquiring means of acquiring a training image in which a region containing an image of an object has a ground-truth label attached thereto;

a score assigning means for assigning, to each of unit regions, a score which indicates objectness, by inputting the training image to a region detection model for detecting, in an image, a region corresponding to an image of an object;

a first pseudo label assigning means for assigning a pseudo label which indicates an object, to a partial region of the region having the ground-truth label attached thereto, in accordance with the score assigned to each of the unit regions;

a second pseudo label assigning means for assigning a pseudo label which indicates a background, to a partial region of a region not having the ground-truth label attached thereto, in accordance with the score assigned to each of the unit regions; and an updating means for updating a model parameter of the region detection model, with reference to a region having attached thereto the pseudo label which indicates an object or the pseudo label which indicates a background.

(Supplementary Note 15)

An information processing apparatus including at least one processor, the at least one processor carrying out: an acquiring process of acquiring a training image in which a region containing an image of an object has a ground-truth label attached thereto; a score assigning process of assigning, to each of unit regions, a score which indicates objectness, by inputting the training image to a region detection model for detecting, in an image, a region corresponding to an image of an object; a first pseudo label assigning process of assigning a pseudo label which indicates an object, to a partial region of the region having the ground-truth label attached thereto, in accordance with the score assigned to each of the unit regions; a second pseudo label assigning process of assigning a pseudo label which indicates a background, to a partial region of a region not having the ground-truth label attached thereto, in accordance with the score assigned to each of the unit regions; and an updating process of updating a model parameter of the region detection model, with reference to a region having attached thereto the pseudo label which indicates an object or the pseudo label which indicates a background.

This information processing apparatus may further include a memory, and this memory may have stored therein a program for causing the at least one processor to carry out the acquiring process, the score assigning process, the first pseudo label assigning process, and the second pseudo label assigning process. In addition, this program may be recorded on a computer-readable, non-transitory, and tangible recording medium.

Although the present invention has been described with reference to the above example embodiments, etc., the present invention is not limited to the foregoing example embodiments. Various modifications which can be understood by a person skilled in the art can be made within the scope of the present invention, to the configurations and details of the present invention. At least one of the functions of the information processing apparatuses 1, 1A, 1B, and 1C above may be executed by a plurality of different information processing apparatuses each of which is installed in and connected to any location on a network, i.e., may be executed by so-called cloud computing.

REFERENCE SIGNS LIST

1, 1A, 1B, 1C: Information processing apparatus
11: Acquiring section
11A: Image acquiring section
12: Score assigning section
12A: Region judging section
13: First pseudo label assigning section
13A, 13B: Pseudo label generating section
14: Second pseudo label assigning section
14A: Model training section
15: Updating section
15A: Completion judging section
17: Region detecting section
121B: First region judging section
122B: Second region judging section
LM1: Detection model
LM2: Second detection model
S1: Information processing method

The invention claimed is:

1. An information processing apparatus comprising at least one processor, the at least one processor carrying out:

an acquiring process of acquiring a training image in which a region containing an image of an object has a ground-truth label attached thereto;

a score assigning process of assigning, to each of unit regions, a score which indicates objectness, by inputting the training image to a region detection model for detecting, in an image, a region corresponding to an image of an object;

a first pseudo label assigning process of assigning a pseudo label which indicates an object, to a partial region of the region having the ground-truth label attached thereto, in accordance with the score assigned to each of the unit regions;

a second pseudo label assigning process of assigning a pseudo label which indicates a background, to a partial region of a region not having the ground-truth label attached thereto, in accordance with the score assigned to each of the unit regions;

an updating process of updating a model parameter of the region detection model, with reference to a region having attached thereto the pseudo label which indicates an object or the pseudo label which indicates a background;

a detecting process of inputting a captured image to the region detection model with the updated model parameter to detect an object region contained in the captured image, and outputting information representing the detected object region for display on a terminal, wherein in the first pseudo label assigning process, the at least one processor assigns the pseudo label which indicates an object, to a unit region having been assigned the score that falls within a range of scores including a highest score, the range corresponding to a predetermined proportion, in the region having the ground-truth label attached thereto, wherein the training image contains a plurality of regions each being the region containing an image of an object, and wherein in the first pseudo label assigning process, the at least one processor assigns the pseudo label which indicates an object, to the unit region having been assigned the score that falls within a range of scores including a highest score, the range corresponding to a predetermined proportion, in each of the plurality of regions each of which contains an image of an object.

2. The information processing apparatus according to claim 1, wherein in the second pseudo label assigning process, the at least one processor assigns the pseudo label which indicates a background, to a unit region having been assigned the score that falls within a range of scores including a lowest score, the range corresponding to a predetermined proportion, in the region not having the ground-truth label attached thereto.

3. The information processing apparatus according to claim 1, wherein the ground-truth label is a class label, in the score assigning process, the at least one processor assigns a score for each of classes, to each of the unit regions contained in the training image, and in the first pseudo label assigning process, the at least one processor assigns a pseudo label which indicates one of the classes, to the partial region of the region having the ground-truth label attached thereto, in accordance with the score assigned to each of the unit regions.

4. The information processing apparatus according to claim 1, wherein in the first pseudo label assigning process, the at least one processor:

assigns the pseudo label which indicates an object, to the partial region of the region having the ground-truth label attached thereto, in accordance with the score assigned to each of the unit regions; and further assigns the pseudo label which indicates an object, to the partial region of the region not having the ground-truth label attached thereto, in accordance with the score assigned to each of the unit regions.

5. The information processing apparatus according to claim 4, wherein the at least one processor further carries out:

an identification label assigning process of assigning, to each of the unit regions contained in the region having the ground-truth label attached thereto, an identification label which indicates an object or a background, by inputting at least a part of the training image to a second region detection model for detecting, in an image, a region corresponding to an image of an object; and a threshold determining process of determining a threshold in accordance with a score distribution of the unit regions each having attached thereto the identification label which indicates an object and a score distribution of the unit regions each having attached thereto the identification label which indicates a background, and in the first pseudo label assigning process, the at least one processor assigns the pseudo label which indicates an object, to a unit region having been assigned the score which is equal to or greater than the threshold in the training image, and in the second pseudo label assigning process, the at least one processor assigns the pseudo label which indicates a background, to a unit region having been assigned the score which is smaller than the threshold or a second threshold smaller than the threshold in the training image.

6. The information processing apparatus according to claim 5, wherein in the threshold determining process, the at least one processor uses, as the threshold, a value obtained by adding a predetermined value to an average of a center of gravity of the score distribution of the unit regions each having attached thereto the identification label which indicates an object and a center of gravity of the score distribution of the unit regions each having attached thereto the identification label which indicates a background, and uses, as the second threshold, a value obtained by subtracting the predetermined value from the average, and in the second pseudo label assigning process, the at least one processor assigns the pseudo label which indicates a background, to a unit region having been assigned the score which is smaller than the second threshold in the training image.

7. An information processing method comprising:

at least one processor acquiring a training image in which a region containing an image of an object has a ground-truth label attached thereto;

the at least one processor assigning, to each of unit regions, a score which indicates objectness, by inputting the training image to a region detection model for detecting, in an image, a region corresponding to an image of an object;

the at least one processor assigning a pseudo label which indicates an object, to a partial region of the region having the ground-truth label attached thereto, in accordance with the score assigned to each of the unit regions;

the at least one processor assigning a pseudo label which indicates a background, to a partial region of a region not having the ground-truth label attached thereto, in accordance with the score assigned to each of the unit regions;

the at least one processor updating a model parameter of the region detection model, with reference to a region having attached thereto the pseudo label which indicates an object or the pseudo label which indicates a background; and the at least one processor inputting a captured image to the region detection model with the updated model parameter to detect an object region contained in the captured image, and outputting information representing the detected object region for display on a terminal, wherein in assigning the pseudo label which indicates an object, the at least one processor assigns the pseudo label which indicates an object, to a unit region having been assigned the score that falls within a range of scores including a highest score, the range corresponding to a predetermined proportion, in the region having the ground-truth label attached thereto, wherein the training image contains a plurality of regions each being the region containing an image of an object, and wherein in assigning the pseudo label which indicates an object, the at least one processor assigns the pseudo label which indicates an object, to the unit region having been assigned the score that falls within a range of scores including a highest score, the range corresponding to a predetermined proportion, in each of the plurality of regions each of which contains an image of an object.

8. A computer-readable, non-transitory recording medium having recorded thereon a program for causing a computer to carry out:

a process of acquiring a training image in which a region containing an image of an object has a ground-truth label attached thereto;

a process of assigning, to each of unit regions, a score which indicates objectness, by inputting the training image to a region detection model for detecting, in an image, a region corresponding to an image of an object;

a process of assigning a pseudo label which indicates an object, to a partial region of the region having the ground-truth label attached thereto, in accordance with the score assigned to each of the unit regions;

a process of assigning a pseudo label which indicates a background, to a partial region of a region not having the ground-truth label attached thereto, in accordance with the score assigned to each of the unit regions;

a process of updating a model parameter of the region detection model, with reference to a region having attached thereto the pseudo label which indicates an object or the pseudo label which indicates a background; and a process of inputting a captured image to the region detection model with the updated model parameter to detect an object region contained in the captured image, and outputting information representing the detected object region for display on a terminal, wherein in the process of assigning a pseudo label which indicates an object, the computer assigns the pseudo label which indicates an object, to a unit region having been assigned the score that falls within a range of scores including a highest score, the range corresponding to a predetermined proportion, in the region having the ground-truth label attached thereto, wherein the training image contains a plurality of regions each being the region containing an image of an object, and wherein in the process of assigning a pseudo label which indicates an object, the computer assigns the pseudo label which indicates an object, to the unit region having been assigned the score that falls within a range of scores including a highest score, the range corresponding to a predetermined proportion, in each of the plurality of regions each of which contains an image of an object.

* * * * *